April 10, 1951     L. R. YOUNG     2,548,279
ADJUSTABLE TRAVELING POWER-OPERATED TABLE SAW
Filed Oct. 1, 1946     2 Sheets—Sheet 1
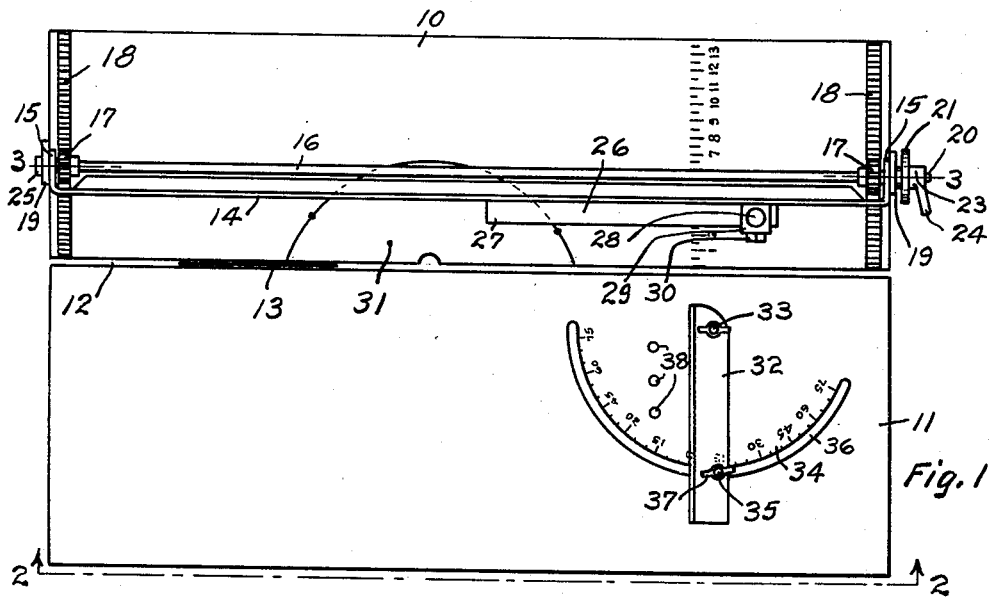
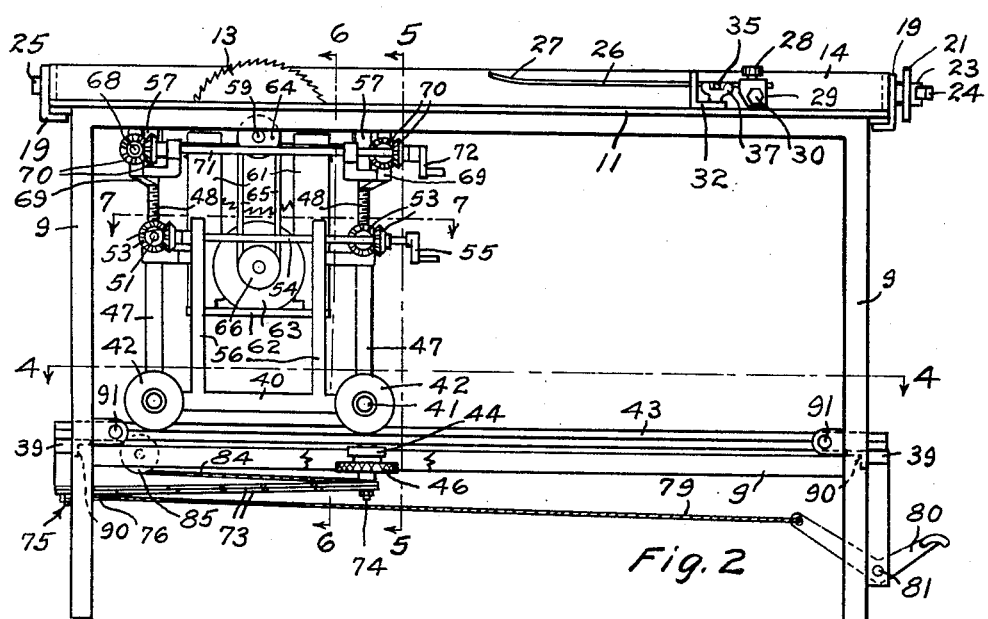
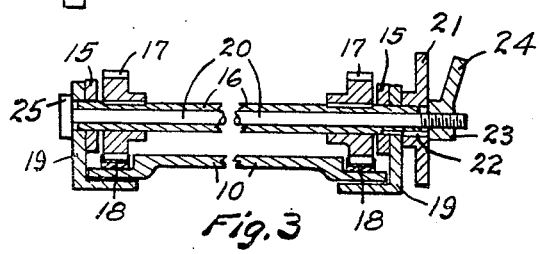
INVENTOR
Lawrence Romaine Young
BY
Fred C. Matheny
ATTORNEY

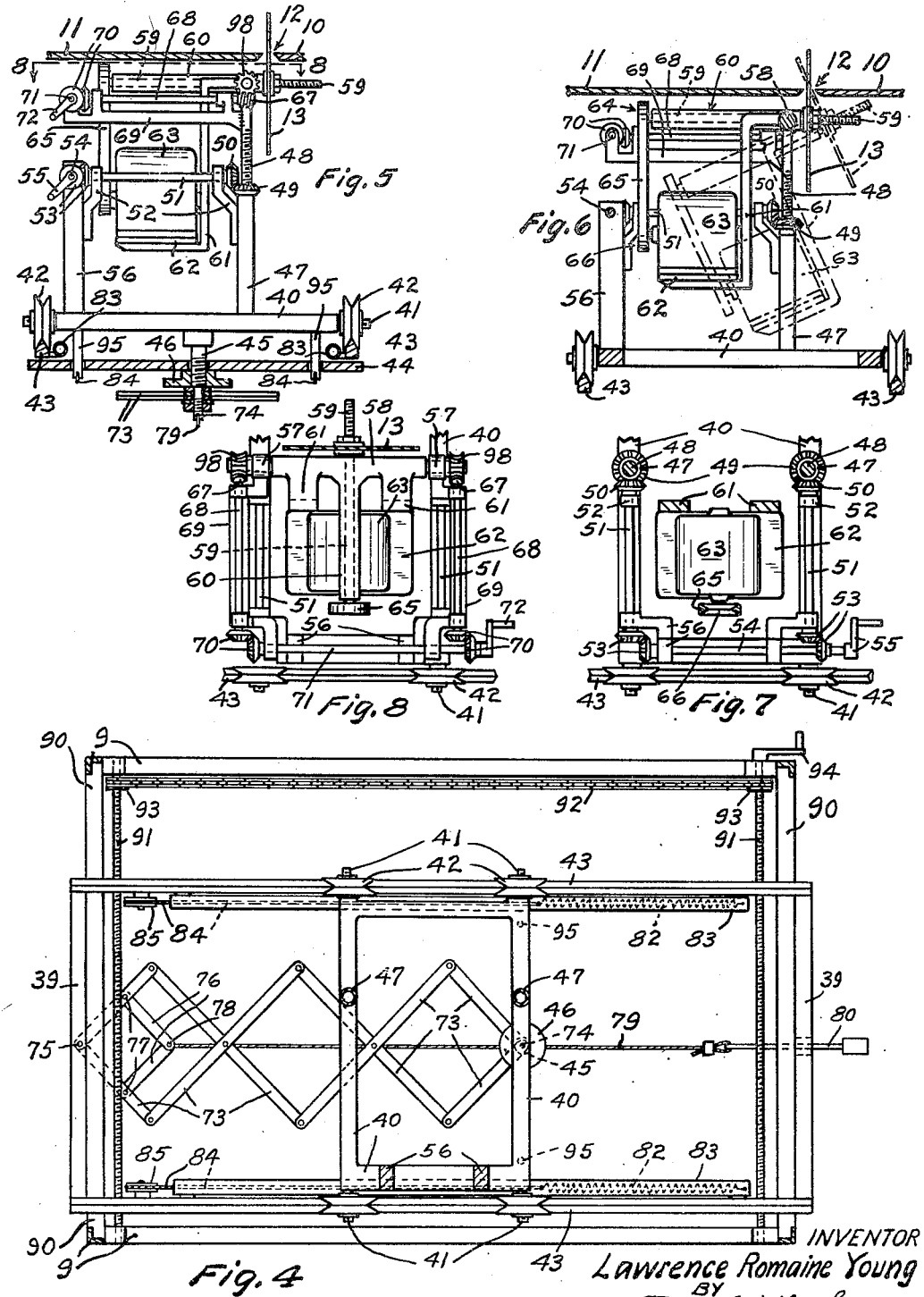

Patented Apr. 10, 1951

2,548,279

UNITED STATES PATENT OFFICE 2,548,279

ADJUSTABLE TRAVELING POWER-OPERATED TABLE SAW

Lawrence Romaine Young, Seattle, Wash.

Application October 1, 1946, Serial No. 700,492

3 Claims. (Cl. 143—47)

1

This invention relates to an adjustable traveling power operated table saw in which the saw is movable relative to the work.

An object of this invention is to provide an adjustable traveling power operated table saw that is simple, durable and inexpensive in construction, that is efficient and accurate in operation; and one that is easy to operate and that will save time and labor in ordinary construction and cabinet work in which wood is used.

Another object is to provide an adjustable traveling power operated table saw in which means are provided for tilting a longitudinally movable driven circular saw blade that extends upwardly through a slot in the table so that lumber supported on the table in the path of the saw can be cut on a bevel.

Another object is to provide a longitudinally movable circular saw which can be locked as respects longitudinal movement thereof and adjusted to any desired angle between a vertical and a horizontal position for use as a fixed saw to which work may be fed.

Another object is to provide a power operated movable circular table saw that is well adapted for all ordinary sawing operations, such as cross cut work, rip saw work, diagonal cutting, bevel cutting, compound diagonal and bevel cutting, dado work and any other work ordinarily encountered in wood construction which can be done with a saw or rotating tool of a similar type.

Another object is to provide simple and efficient foot operated means for stroking or imparting longitudinal movement to a saw relative to a saw table, said means comprising lazy tong links operated by a foot pedal.

Other objects of the invention will be apparent from the following description taken in connection with the accompanying drawings.

In the drawings Figure 1 is a plan view of a power operated table saw constructed in accordance with this invention.

Fig. 2 is a side elevation of the same looking in the direction of broken line 2—2 of Fig. 1.

Fig. 3 is a fragmentary cross sectional view on a larger scale than Figs. 1 and 2 taken substantially on broken line 3—3 of Fig. 1, and showing means for mounting and adjusting and locking a straight edge.

Fig. 4 is a plan view, with parts in section, taken substantially on broken line 4—4 of Fig. 2, showing carriage and track means and devices for moving the carriage.

Fig. 5 is a view partly in section and partly in elevation taken substantially on broken line 5—5 of Fig. 2.

2

Fig. 6 is a view partly in section and partly in elevation taken substantially on broken line 6—6 of Fig. 2, an inclined position of the saw being shown by dot and dash lines.

Fig. 7 is a view partly in plan and partly in section taken substantially on broken line 7—7 of Fig. 2.

Fig. 8 is a view partly in plan and partly in section taken substantially on broken line 8—8 of Fig. 5.

The drawings show a table comprising two plane flat horizontal table top sections 10 and 11 supported on upright frame means 9 and separated by a saw slot 12. A circular saw 13, supported and driven as hereinafter explained projects upwardly through said saw slot and is movable longitudinally of the table 10—11.

A straight edge member 14 is supported at one side of the path of the saw for movement over the table section 10 toward and away from the saw. Preferably the straight edge member 14 is of angle shaped cross section, see Fig. 1. Also preferably the straight edge member 14 has two bearing members 15 provided at opposite ends thereof to receive a tubular shaft 16. The tubular shaft 16 extends parallel to the straight edge 14 and carries two fixedly mounted gear pinions 17. The gear pinions 17 are respectively positioned adjacent the two ends of the shaft 16, and mesh with toothed rack bars 18. The rack bars 18 are preferably positioned below the level of the table top, as shown in Fig. 3, to avoid interference with lumber that is being sawed and said rack bars 18 are secured to the table top section 10.

The pinions 17 are positioned adjacent the inner sides of the bearing members 15. Two angle brackets 19 are positioned adjacent the outer faces of the bearing members 15 and are connected with these bearing members 15 by means as hereinafter described.

The horizontal flange of each angle bracket 19, see Fig. 3, extends under the adjacent edge of the table member 10 and cooperates in holding the adjacent pinion 17 in engagement with its gear rack 18. A clamping rod 20 extends through the tubular shaft 16 and through the upright flanges of the angle brackets 19. The tubular shaft 16 also extends through the upright flange of the angle bracket 19 shown at the right in Figs. 1 and 4, and the rod 20 is within this tubular shaft 16. A hand wheel 21 is secured on the forward end portion of the tubular shaft 16, shown at the right in Figs. 1, 2 and 3 by means such as a spline or key member 22 that locks the tubular shaft 16 and hand wheel 21 together for synchronous turning movement but allows for some longitudinal movement of the hand wheel 21 on the tubular shaft 16. The hub portion of the hand wheel 21 engages with the adjacent angle bracket 19.

A nut member 23 having an integral handle portion 24 is threaded onto the forward end portion of the clamping rod 20. The rear end portion of the clamping rod 20 carries a fixed member such as a head 25 that engages with the angle bracket 19 at the rear end of the saw table.

When the nut 23 is tightened against the hand wheel 21 the two angle brackets 19 will be clamped against opposite ends of the table member 10 and the straight edge 14 will be securely locked against movement. When the nut 23 is retracted as respects the hand wheel 21 then the straight edge 14 will be released and the hand wheel 21 and tubular shaft 16 can be turned to move the straight edge 14 toward or away from the saw.

Preferably the table top section 10 is graduated crosswise in inches to facilitate setting the straight edge 14 at any desired distance from the path of movement of the saw. The graduations on the table top section 10 can also be used, without reference to the straight edge 14, to indicate the length which will be cut off of the end of a piece of lumber that lies crosswise of the saw slot 12.

A combined hold down and hold over member 26 in the form of a flat piece of spring metal with an upwardly curved end portion 27 is provided. This member 26 is adapted to be attached to the straight edge 14 to hold any piece of material that is inserted under said member 26 down on the table. The member 26 is secured, as by a screw 28, to a mounting block 29. When the member 26 is to be used as a hold down the mounting block 29 is secured to the straight edge 14, as by bolt means 30. When said member 26 is to be used as a hold over then the block 29 is secured to the table section 11 as by means of holes 38 and the member 26 engages with the edge of the piece of wood that is being sawed.

Preferably a segment 31 of the table top section 10 alongside of the saw slot 12 is removable to allow for fixed operation of the saw 13 at this location, at an angle greater than said saw can be operated at when in the slot 12. This allows the saw to be positioned at any angle between a vertical and a horizontal position. Also when the saw shaft is in a vertical position then the saw 13 can be replaced by a dado saw, a cutter or matcher head, a sander, or a similar tool.

The table top section 11 is provided with an angle gauge 32 against which a piece of material that is to be cut at a predetermined angle can be placed. Preferably this angle gauge 32 is in the nature of a piece of angle iron attached by a pivot member 33 to the table top section 11 and movable over a dial 34 that is graduated in degrees. A bolt 35 is operable in an arcuate slot 36 in the table top section 11 and extends through the angle gauge 32 and has a wing nut 37 on its upper end. The bolt 35 can be used to clamp and hold the angle gauge 32 in any desired position.

A saw carriage is mounted below the table 10—11 for movement longitudinally thereof. This saw carriage comprises a horizontal rectangular frame 40 having four bearing pins 41 on which wheels 42 are mounted. Each wheel 42 has a circumferential V-shaped groove and said wheels are supported for movement on longitudinally disposed parallel track bars 43.

The track bars 43 are adjustable transversely of the saw frame. One way of providing for this transverse adjustment of the track bars 43 is to secure said track bars to two cross bars 39 which are positioned at the ends of the track bars and are supported on two transverse frame members 90. Two adjusting screws 91 are connected with the track bars 43 for adjusting the same, see Fig. 4. A link belt 92 on sprocket wheels 93 can be used to connect the two screws 41. A crank 94 is provided on one of said screws 91. Rotary movement of crank 94 will simultaneously turn said screws to provide the same adjustment of both ends of the track bars 43.

A brake bar 44 is provided underneath the saw carriage and underneath the track bars 43 to clamp against said track bars 43 and hold the carriage in a fixed position when the saw is being used as a stationary saw and the work is being fed to the saw. Screw means 45, Fig. 5, having a hand wheel 46 thereon is provided for clamping the brake 44 against the bottom portions of the track bars to hold the carriage in a fixed position. Two guide pins 95 rigid with frame 40 cooperate in supporting the brake bar 44.

Two tubular guide members 47 are carried by and extend upwardly from the portion of the frame 40 shown at the right in Fig. 5. Two threaded posts 48 are telescopically disposed in the guide members 47 for adjustably supporting the motor and saw unit, as hereinafter described. Two bevel gears 49 are threaded onto the posts 48 and are supported on the top end portions of the tubular guide members 47. The two bevel gears 49 mesh with two other bevel gears 50 on two horizontal shafts 51. The two horizontal shafts 51 are rotatively supported in brackets 52 and are connected by two pairs of bevel gears 53 with a manually adjustable cross shaft 54 that is provided with a crank 55 by which it may be turned. Two upright brackets 56 carried by the frame 40 support the shaft 54. The threads on the posts 48 and in the hubs of bevel gears 49 are of relatively flat pitch and the friction in these threads and in the adjusting mechanism connected therewith will render this structure self locking for the different positions into which the posts 48 are adjusted. Obviously a worm wheel and worm can be used in place of the bevel gears 49 and 50.

The top end portion of each threaded post 48, see Fig. 8, carries a bearing member 57. A transverse frame member 58, Figs. 6 and 8, is supported for angular movement in the bearing members 57. The shaft or arbor 59 which carries the saw 13 is journaled in a tubular bearing member 60 that is perpendicular to the frame member 58 and rigid therewith. Motor supporting bracket means 61 is secured to the frame member 58 and extends downwardly therefrom. A platform 62 is carried by the bracket means 61 and extends at right angles therefrom. The bracket means 61 and platform 62 taken together form an L-shaped motor bracket. These parts 61 and 62 together with the frame member 58 and bearing tube 60 constitute a swingingly mounted saw supporting frame.

A motor 63 is secured on the platform 62. A driving connection between motor 63 and the saw shaft 59 is provided by pulley 64, V belt 65 and pulley 66.

Preferably an end portion of the arbor 59 extends beyond the saw 13 for a substantial distance and is threaded, as shown in Figs. 5 and 6. The saw 13 can be adjusted along this outwardly protruding portion of the arbor. This adjustment is of advantage when the saw is positioned parallel to and above the table 10—11 and it is desired to keep the frame means 58 entirely beneath the top plane of the table.

Means are provided for angularly adjusting the frame member 58 so as to adjust the angle of the saw 13 to cut on different bevels. This means comprises two worm wheels 98 secured to the respective end portions of the frame member 58. Two worms 67 carried on two shafts 68 mesh with the worm wheels 98. The shafts 68 are journaled in brackets 69 that are rigid with and carried by the upper end portions of the threaded posts 48. The shafts 68 and worms 67 are thus supported for simultaneous vertical movement along with the frame 58 and can be used to angularly move said frame 58 together with the motor and saw carried thereby.

Two pairs of bevel gears 70 connect the shafts 68 with a manually operable cross shaft 71 by which the worms 67 can be simultaneously rotated to angularly adjust the frame member 58. Suitable crank means 72 is connected with the cross shaft 71. The bearing brackets 69 may also provide bearings for the shaft 71.

Foot operated means are provided for moving the saw carriage along the track members 43 to thereby move the saw relative to the work. This means is adapted to impart a relatively long stroke to the saw in response to a relatively short stroke of a foot pedal 80.

This means comprises a set of relatively crossed pivotally connected lazy tong levers 73, Fig. 4, having their front end portions connected by a pivot 74, Figs. 2, 4 and 5, with the front portion of the saw carriage 54 and their rear end portions connected by a pivot 75 with a fixed part of the frame 9. The two lazy tong members adjacent the pivot 75 have two shorter lazy tong links connected therewith by pivot members 77. A common pivot 78 connects these shorter links with an operating cable 79 that extends to the front end of the machine and is connected with a foot lever 80. The foot lever 80 is fulcrumed on a pivot 81 and positioned where it is easily reached by the operator.

The saw carriage is moved into a retracted position by spring means. This spring means preferably comprises two tension springs 82, Fig. 4, disposed in tubes 83 and connected with the carriage frame 40 by cables 84 which pass over sheaves 85.

In the operation of this saw the saw blade 13 extends upwardly through the slot 12 and is movable along said slot by operation of the foot pedal 80. When the saw is vertically positioned as shown by full lines in Figs. 5 and 6 it will vertically cut any piece of lumber or like material that is positioned across the slot 12. The saw 13 is adjusted into an inclined position, as shown by dot and dash lines in Fig. 6, by operating the crank 72, Figs. 2 and 8, and simultaneously adjusting the tracks 43 and carriage supported thereon transversely of the table. This transverse adjustment is necessary to properly position the inclined saw in the slot 12. When the saw is thus tilted it will obviously cut on any bevel to which it is set, any material that is supported on the table top 11 in the path of the saw.

The amount to which the saw can be tilted in the direction shown by dot and dash lines in Fig. 6 is limited only by the clearance of the slot 12 and by the length of the portion of shaft 59 which protrudes to the right of the saw as seen in Fig. 6. The saw can also be tilted a limited amount in a clockwise direction, as respects the showing in Fig. 6, by lowering said saw and angularly moving the bottom end portion of the swinging frame 58, 60, 61, 62 to the left. Angular movement in this direction is limited as the belt 65 will tend to contact either the shaft 54 or the under side of the table 11.

By removing the table top segment 31, Fig. 1, it is possible to position the saw 13, or an equivalent rotary cutter on the shaft 59 in a horizontal or near horizontal position above the top of the table 11. When the device is thus operated the saw 13 can be adjusted or moved outwardly on the shaft 59 or the member 58 can be adjusted or elevated above the table top or both of these adjustments can be used.

Obviously changes in this invention can be made within the scope of the following claims.

I claim:

1. In a saw, a saw table having a table top provided with a longitudinally extending saw slot; horizontal track means supported by said table below said table top; a carriage movable on said track means; two tubular guide members rigid with said carriage and extending upwardly therefrom; two posts supported for vertical adjustment in said guide members; means for vertically adjusting said posts; a bearing carried by the upper end portion of each post; a swinging frame supported for swinging movement and for vertical adjustment by said bearings; two worm wheels carried by said swinging frame coaxial with said bearings; two worms carried by said vertically adjustable posts meshing with the respective worm wheels for swingingly adjusting said frame and holding said frame in adjusted position; means for simultaneously rotating said worms; and a driven circular saw carried by said swinging frame and extending upwardly through the slot in said table top.

2. In a saw, a table having a table top provided with a longitudinally extending slot; a carriage positioned below said table top and movable longitudinally thereof; a longitudinally extending transversely adjustable track carried by said table and supporting said carriage; lazy tongs means carried by said transversely adjustable track and connected with said carriage; foot actuated means carried by said track for operating said lazy tongs means to impart a relatively long movement to said carriage in response to a relatively short movement of said foot actuated means; a frame mounted for transverse tilting movement on said carriage; a driven rotary saw carried by said tiltingly mounted frame and extending upwardly through said saw slot; and means for tilting said frame to position said saw at different angles relative to said table top to thereby bevel cut material that rests on said table top.

3. In a saw, a saw table having a table top provided with a longitudinally extending saw slot; horizontal track means supported by said table below the table top; devices for adjusting said track means transversely of the table top; a carriage movable on said track means, lazy tongs means connected with said carriage for moving the same; a foot pedal operatively connected with said lazy tongs means; a frame swingingly mounted on said carriage; a driven circular saw carried by said frame and extending up through said slot; means for vertically adjusting said swinging frame relative to said table top; and means for angularly adjusting said swinging frame to thereby vary the angle of said saw relative to material on said table.

LAWRENCE ROMAINE YOUNG.

REFERENCES CITED

The following references are of record in the file of this patent:

UNITED STATES PATENTS

| Number | Name | Date |
|---|---|---|
| Re. 4,763 | Grosvenor | Feb. 20, 1872 |
| 404,233 | Teeguarden | May 28, 1889 |
| 788,434 | Shollenberger | Apr. 25, 1905 |
| 1,593,317 | Thomes | July 20, 1926 |
| 1,707,764 | Mattison | Apr. 2, 1929 |
| 1,796,697 | White | Mar. 17, 1931 |
| 1,813,783 | Tomlinson et al. | July 7, 1931 |
| 1,816,069 | Bennett | July 28, 1931 |
| 1,826,222 | Peterson | Oct. 6, 1931 |
| 1,925,090 | Birtles | Sept. 5, 1933 |
| 1,930,168 | Hall | Oct. 10, 1933 |
| 2,062,969 | Dutcher | Dec. 1, 1936 |
| 2,168,282 | Tautz | Aug. 1, 1939 |
| 2,294,272 | Boice | Aug. 25, 1942 |
| 2,313,617 | Bray | Mar. 9, 1943 |
| 2,323,248 | Sellmeyer | June 29, 1943 |